United States Patent
Kimmitt et al.

(10) Patent No.: US 7,394,992 B2
(45) Date of Patent: Jul. 1, 2008

(54) CONTROL OF AN OPTICAL MODULATOR FOR DESIRED BIASING OF DATA AND PULSE MODULATORS

(75) Inventors: Myles Kimmitt, Shrewsbury, MA (US); John E. Kaufmann, Maynard, MA (US); Yuval Shohet, Acton, MA (US); Kent Springer, Pepperell, MA (US); Tina Fjelde, Boston, MA (US); Pavel V. Mamyshev, Morganville, NJ (US); Benny P. Mikkelsen, Boston, MA (US)

(73) Assignee: Mintera Corporation, Acton, MA (US)

( * ) Notice: Subject to any disclaimer, the term of this patent is extended or adjusted under 35 U.S.C. 154(b) by 714 days.

(21) Appl. No.: 10/386,358

(22) Filed: Mar. 11, 2003

(65) Prior Publication Data
US 2003/0175037 A1    Sep. 18, 2003

Related U.S. Application Data

(60) Provisional application No. 60/364,822, filed on Mar. 15, 2002.

(51) Int. Cl.
*H04B 10/16* (2006.01)
*H04B 10/00* (2006.01)
*H04B 10/04* (2006.01)

(52) U.S. Cl. .................. 398/185; 398/37; 398/185; 398/186; 398/188; 398/198

(58) Field of Classification Search .............. 332/106; 398/197–198, 183, 185–189, 37; 359/279; 385/3

See application file for complete search history.

(56) References Cited

U.S. PATENT DOCUMENTS 6,671,079 B2 * 12/2003 Fuller et al. .............. 359/264

(Continued)

OTHER PUBLICATIONS

Esman et al., "Wideband Efficiency Improvement of Fiber Optic Systems by Carrier Subtraction", IEEE Photonics Technology Letters, vol. 7, No. 2, Feb. 1995.
Photonic Systems, Inc., Model 0203, Large-Signal Modulator Bias Controller, Specification Information.
Photonic Systems, Inc., Model 0202, Modulator Bias Controller, Specification Information.

*Primary Examiner*—Jason Chan
*Assistant Examiner*—Danny W Leung
(74) *Attorney, Agent, or Firm*—Weingarten, Schurgin, Gagnebin & Lebovici LLP

(57) ABSTRACT

In an optical transmitter, continuous wave light from a laser passes through a data modulator (DM) for non-return-to-zero (NRZ) encoding of a data stream and through a pulse modulator to add return-to-zero encoding to the modulated optical signal. A modulator controller monitors the output optical signal power, optimizes the bias setting for the DM and the PM, and optimizes the phase relationship between the pulse and data components of the modulated optical signal. For each optimization, a low amplitude and low frequency dither signal is injected at appropriate points in the modulator. A single photo detector and electrical receiver are used in a multiplexed fashion to monitor the optical output signal and derive separate feedback signals. Remaining control circuitry forces a null in a respective residual dither component in the optical output signal to maintain the desired bias level or phase alignment.

63 Claims, 14 Drawing Sheets

U.S. PATENT DOCUMENTS

| | | | |
|---|---|---|---|
| 6,687,451 B1 * | 2/2004 | Sikora | 398/187 |
| 6,952,534 B1 * | 10/2005 | Sikora | 398/183 |
| 6,980,746 B2 * | 12/2005 | Hayee | 398/183 |
| 2002/0047750 A1 * | 4/2002 | Geiger et al. | 332/106 |
| 2002/0114047 A1 * | 8/2002 | McBrien et al. | 359/180 |

* cited by examiner

CONTROL OF AN OPTICAL MODULATOR FOR DESIRED BIASING OF DATA AND PULSE MODULATORS

CROSS REFERENCE TO RELATED APPLICATIONS

This application claims priority under 35 U.S.C. §119(e) of U.S. Provisional Patent Application No. 60/364,822 filed Mar. 15, 2002.

STATEMENT REGARDING FEDERALLY SPONSORED RESEARCH OR DEVELOPMENT

Not Applicable

BACKGROUND OF THE INVENTION

The present invention relates generally to data encoding and transmission for telecommunications applications, and more specifically to serial encoding to permit reliable and efficient communication of digital data across a fiber optic cable.

In recent years there has been a desire to transmit data across fiber optic cables at ever increasing speed and over longer distances. Current efforts in the industry are targeted at data transmission rates of 40 Gb/s in a single optical channel over hundreds or thousands of kilometers. The demands of such operating frequencies are driving a need for greater performance from system components, such as optical transmitters. Additionally, because of the relatively high prices of components capable of operating at such frequencies, there is a need to realize cost savings where possible so that the prices of new systems can be set sufficiently low to attract customers. Additionally, because of the wide variety of network installations among different communications providers and the emerging nature of many of the formal and de-facto operating standards, it is desirable that system components be sufficiently flexible so as to be usable in a variety of configurations that might be required in such installations over the expected component lifetime.

Among the variations in network installations are the use of different modulation techniques. Non Return-to-Zero (NRZ) modulation is in widespread use and offers relatively simple system design. Binary Phase Shift Key (BPSK) modulation provides power-efficiency gain over NRZ at the expense of more complex transmitter and receiver design. A variant of BPSK is Differential Phase Shift Key (DPSK) modulation in which the baseband binary data is differentially encoded before optical phase modulation. Return-to-Zero (RZ) modulation has beneficial properties in combating distortions seen in fiber optic cables at longer distances. In RZ modulation, the light is turned on and then off to represent one state of a bit, and the light is left off to represent the other state of a bit. Variants of BPSK and DPSK modulation are Return-to-Zero Binary Phase Shift Key (RZ-BPSK) and Return-to-Zero Differential Phase Shift Key (RZ-DPSK) modulation, in which the light is turned on with one phase and then off to represent one binary state, and the light is turned on with another phase and then off to represent the other binary state.

In systems employing any of these modulation formats, the problem of accurately recovering the transmitted data from the received optical signal becomes more difficult as transmission speed and/or distance increases. Generating a very high-quality optical signal at the transmitter becomes more critical. Among the many features of an optical transmitter that contribute to the quality of the transmitted optical signal are the characteristics of the optical modulator. It is important, for example, that the modulator be accurately and stably biased to yield an accurate modulated signal with minimum noise. While there are known techniques for biasing optical modulators that have achieved good operational results, better performance is needed at current and future transmission rates and distances. In systems employing RZ, RZ-BPSK and RZ-DPSK modulation in particular, it is also important to obtain precise, low-jitter phase alignment between a modulating data stream and an RZ pulse stream that are combined to produce the modulated optical signal for transmission.

BRIEF SUMMARY OF THE INVENTION

In accordance with the present invention, methods and apparatus for generating and controlling an optical transmitter are disclosed. A disclosed embodiment supports Non Return-to-Zero (NRZ), Binary Phase Shift Key (BPSK), Differential Phase Shift Key (DPSK), Return-to-Zero (RZ), Return-to-Zero Binary Phase Shift Key (RZ-BPSK) and Return-to-Zero Differential Phase Shift Key (RZ-DPSK) modulation formats. The disclosed techniques can also be extended to other modulation schemes, such as quadrature phase shift key (QPSK), differential quadrature phase shift key (DQPSK), Return-to-Zero quadrature phase shift key (RZ-QPSK), Return-to-Zero differential quadrature phase shift key (RZ-DQPSK), quadrature amplitude modulation (QAM) and Return-to-Zero quadrature amplitude modulation (RZ-QAM).

Continuous wave light is produced by a laser and passed through a data modulator (DM) for encoding the data. The Data Modulator can produce NRZ, BPSK, or DPSK modulation depending on modulator biasing and the level of electrical drive applied to the modulator. The data modulator can be used alone or in combination with a pulse modulator (PM) to produce RZ, RZ-BPSK or RZ-DPSK modulation. The pulse modulator generates a series of pulses in the optical signal that are synchronized with the data component of the optical signal. The modulators are cascaded in either order to produce the RZ, RZ-BPSK or RZ-DPSK modulation.

A modulator control system is disclosed that stabilizes the operation of the data and pulse modulators despite the normal drift of modulator operating characteristics with respect to temperature and aging. The modulator control system monitors the output optical signal power of the optical transmitter and optimizes the bias setting for the DM modulator stage as well as for the PM stage if present/active. For RZ, RZ-BPSK and RZ-DPSK modulation formats, the modulator control system controls the phase relationship between the pulse train and data gating signals used to generate the modulated optical signal. Phase-shifting circuitry used to generate the pulse train can operate at a substantially lower frequency than the pulse rate without sacrificing performance with respect to phase jitter, enabling the use of less expensive, lower-frequency components. The modulator control system utilizes a single low bandwidth photo detector and electrical receiver to monitor the optical output and to derive separate feedback signals used to generate the bias and phase control signals. The control system appears to be less expensive than prior art modulator control systems while providing stable and accurate operating points within the transmitter.

Other aspects, features, and advantages of the present invention will be apparent from the Detailed Description of the Invention that follows.

BRIEF DESCRIPTION OF THE SEVERAL VIEWS OF THE DRAWING

The invention will be more fully understood by reference to the following Detailed Description of the Invention in conjunction with the Drawing, of which.

DETAILED DESCRIPTION OF THE INVENTION

The disclosure of U.S. Provisional Patent Application No. 60/364,822 filed Mar. 15, 2002 is hereby incorporated by reference.

Figure 1:
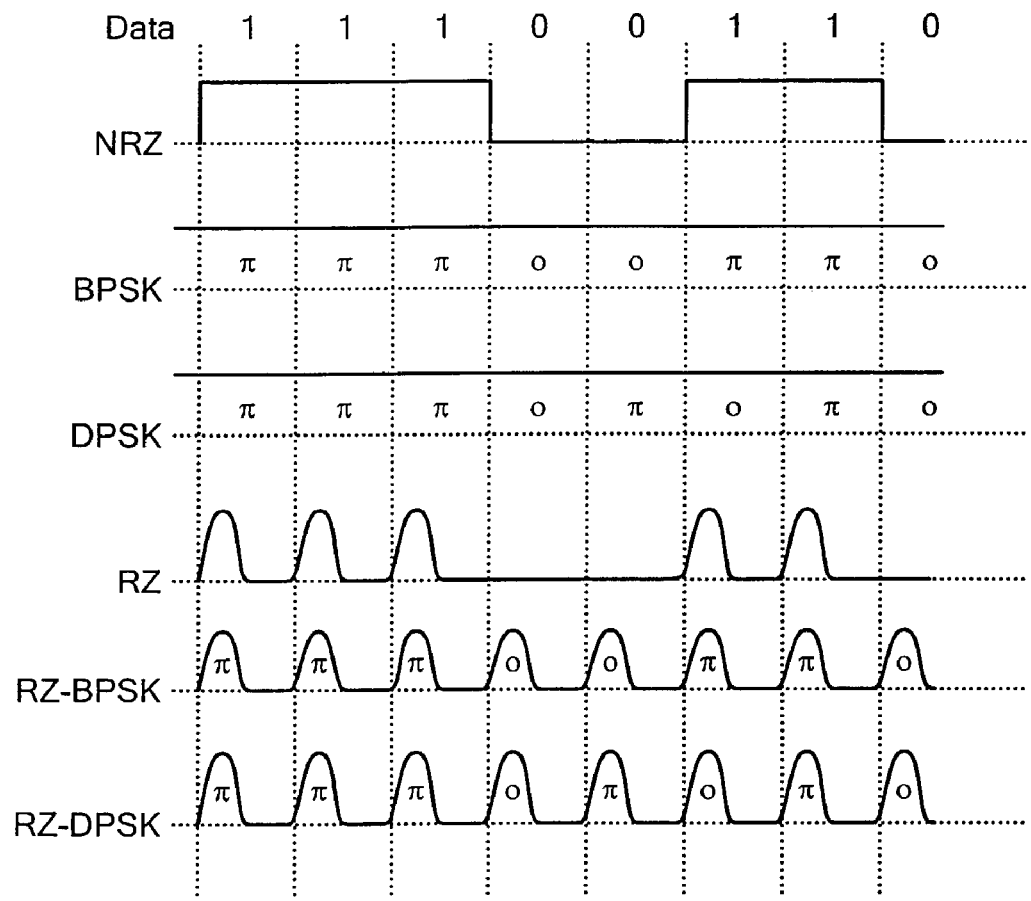
FIG. 1 is a waveform diagram depicting several optical modulation formats as known in the art.

FIG. 1 illustrates several known optical modulation formats. In non-return-to-zero (NRZ) modulation, each binary digit (1 or 0) is conveyed as a corresponding optical amplitude level (on or off) for the entire bit period. Binary phase-shift key (BPSK) modulation produces a constant-envelope signal in which the binary data modulates the optical phase as 0 or 180 degrees. Differential Phase Shift Key (DPSK) modulation is a variant of BPSK in which the binary data is differentially encoded before optical phase modulation. In return-to-zero (RZ) modulation, one binary digit is represented as a pulse occurring within a bit period, and the other binary digit is represented as no pulse. RZ-BPSK and RZ-DPSK modulation is are forms of BPSK and DPSK respectively in which a return-to-zero amplitude transition is imposed every bit period concurrently with the phase modulation.

Figure 2:
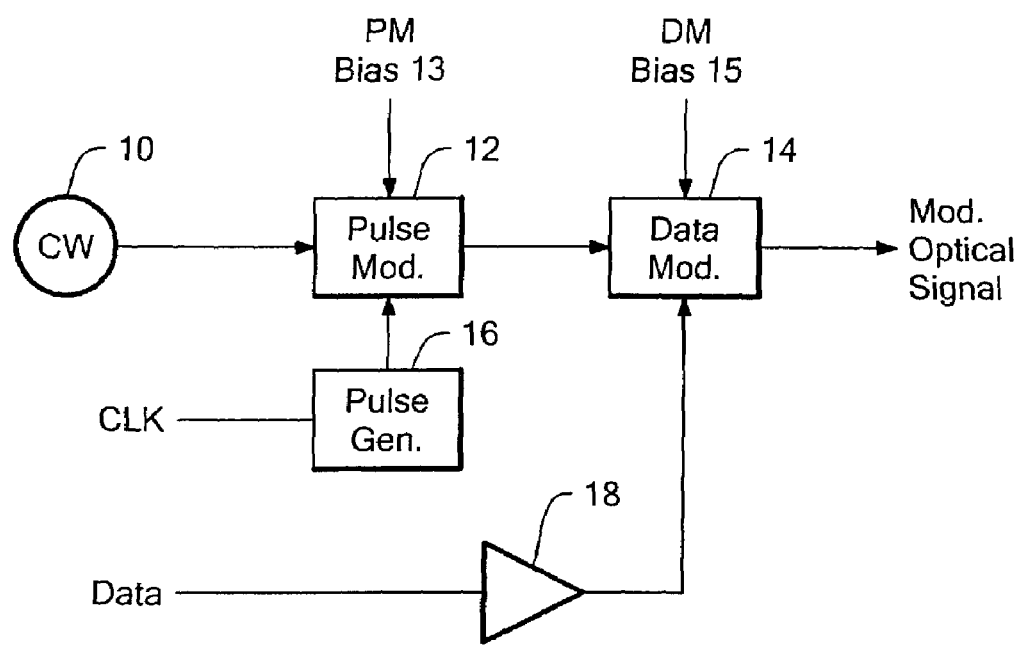
FIG. 2 is a block diagram of an optical transmitter employing cascaded pulse and data modulators as known in the art.

FIG. 2 shows a prior art transmitter for generating either NRZ or RZ waveforms. The output of a continuous-wave (CW) laser 10 drives a first modulator 12 used for pulse modulation, and the output of the first modulator 12 drives a second modulator 14 used for data modulation. The respective operating points of the modulators 12, 14 are established by corresponding bias values 13, 15 supplied to respective bias inputs. The modulation input to the first modulator is generated by a pulse generator 16, which in turn is driven by a reference clock CLK. The modulation input to the second modulator is generated by an analog amplifier 18 fed by the data to be transmitted.

As described above, a transmitter such as that of FIG. 2 can generate RZ, NRZ or phase shift key waveforms. For RZ encoding, both the pulse modulator 12 and the data modulator 14 are utilized in the above-described cascaded manner. For NRZ or phase shift key operation, the pulse modulator 12 is configured to be passive, i.e., to simply pass the input optical signal to the output with as little attenuation as possible. This is accomplished, for example, by driving the data modulation input from the pulse generator 16 to a constant "one" value. The data modulator 14 performs the NRZ modulation based on the input from the amplifier 18.

Figure 3:
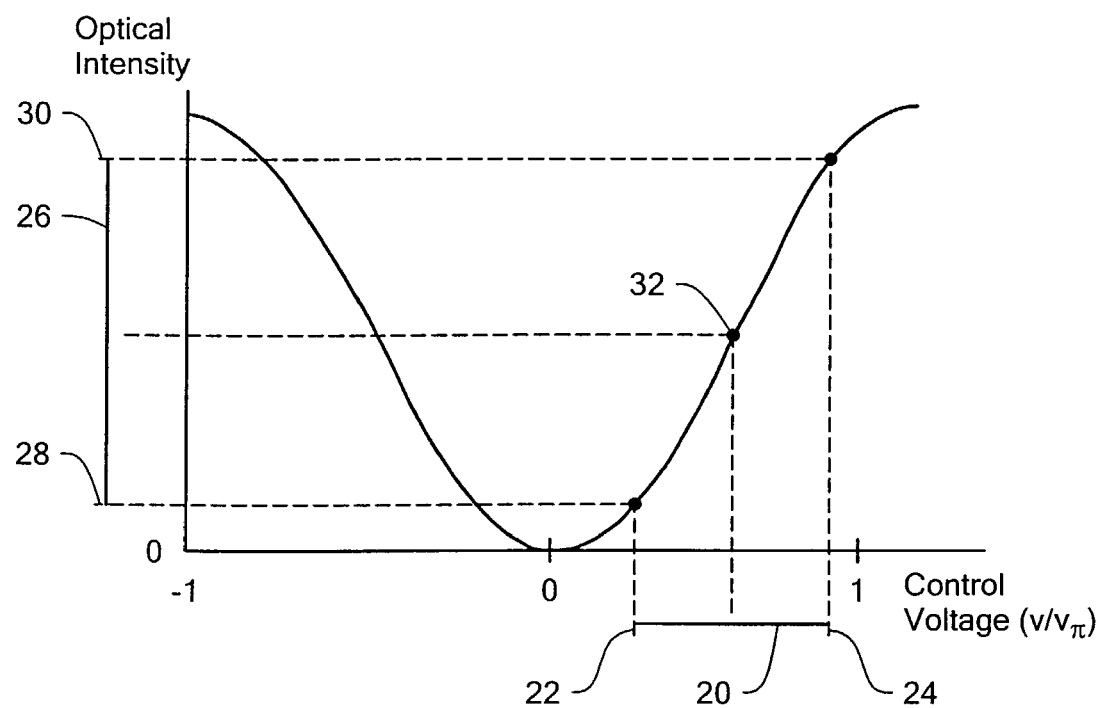
FIG. 3 is a plot of the transfer characteristics (output power vs. bias control voltage) of a Mach-Zehnder (M-Z) optical modulator as known in the art.

FIG. 3 illustrates the general transfer characteristic of a Mach-Zehnder (M-Z) modulator, which is theoretically sinusoidal. When the control voltage is near a first voltage shown as −1 in units of $V_\pi$, the modulator output is a maximum for a given optical input power. As the control voltage increases to a predetermined voltage shown as 0, the modulator output power falls to substantially zero. As the control voltage is further increased to $+V_\pi$, the output power gradually increases until the maximum is reached again. As illustrated, when the control voltage varies over a range 20 from a minimum 22 to a maximum 24, the output optical power varies correspondingly over a range 26 from a minimum 28 to a maximum 30. In the case shown in FIG. 3, the modulator is operating symmetrically about a point 32 residing at the middle of the positive slope of the transfer curve. This point is one of the "quadrature" points of the modulator. The term "quadrature" refers to specific control voltages that are at odd integer multiples of (½) $(V/V_\pi)$, i.e. (½) $(V/V_\pi)$, (³⁄₂) $(V/V_\pi)$.

Figure 4:
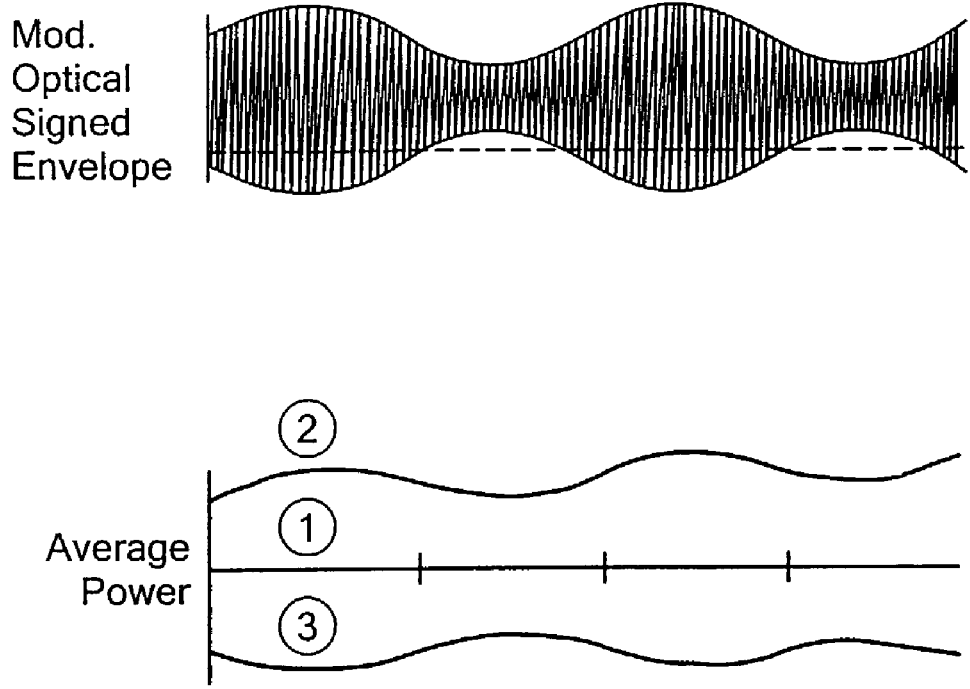
FIG. 4 is a plot of a sample time history of a modulated optical signal and the corresponding average optical power depending on the level of modulator bias with respect to a "quadrature" bias point as known in the art.

There is a known technique for biasing a M-Z modulator at a quadrature point such as the point 32 in FIG. 3. A small amount of amplitude modulation at a very low frequency, such as 3 KHz, is applied to the data signal provided to the control input of the modulator. As shown in FIG. 4, the resulting modulated optical signal has a slight AM envelope. The symmetry of the modulator transfer function and the data waveform produce a null in the amplitude modulation on the optical output power when the bias point is at the quadrature point. The optical output of the modulator is sampled using a coupler, and the sampled optical signal is converted to an electrical signal by a detector such as a positive-intrinsic-negative (PIN) diode. The electrical signal is passed through a low-frequency filter to recover only the modulating tone if present. This feedback signal is used to adjust the bias of the modulator, automatically maintaining bias at quadrature.

Three operating scenarios are illustrated in FIG. 4. In scenario 1, the modulator is operating at the desired quadrature point. Because of the resulting symmetry of the modulation envelope, the average power of the modulated optical signal is constant, and thus the electrical feedback signal has a constant (DC) value. Under these operating conditions, the modulator bias control maintains the bias at its present level.

In the second operating scenario, the modulator is operating slightly above the quadrature point, which results in asymmetry of the modulation envelope. The asymmetry in turn imparts a residual AM envelope on the optical signal out of phase with the applied amplitude modulation, which can be used to drive the modulator bias point back toward quadrature. In the third operating scenario, in which the modulator is operating slightly below the quadrature point, the asymmetry in the modulation envelope has the opposite polarity, and therefore the residual AM envelope on the optical signal is of correspondingly opposite polarity and also drives the modulator bias point back toward quadrature.

There is a second known technique for biasing a M-Z modulator at a quadrature point such as the point 32 in FIG. 3. A small amount of bias dither at a very low frequency, such as 3 kHz, is applied to the bias control input of the modulator. The symmetry of the modulator transfer function and the data waveform produce a slight AM envelope on the optical signal. The resulting AM envelope has a maximum intensity when the modulator is biased at the quadrature point. Simultaneously, the second harmonic of the amplitude modulation is at a null. The optical output of the modulator is sampled using a coupler, and the sampled optical signal is converted to an electrical signal by a detector such as a positive-intrinsic-negative (PIN) diode. The electrical signal is passed through a low-frequency filter to recover only the modulating tone and its second harmonic, if present. Either the maximum in AM intensity or the minimum in the second harmonic level can be used to adjust the bias of the modulator, automatically maintaining bias at quadrature.

Three operating scenarios are possible. In scenario 1, the modulator is operating at the desired quadrature point. Because of the resulting symmetry of the modulation envelope, the AM envelope on the optical signal is at a maximum and the second harmonic is at a minimum so the electrical feedback signal has a constant (DC) value. Under these operating conditions, the modulator bias control maintains the bias at its present level.

In the second operating scenario, the modulator is operating slightly above the quadrature point, which results in asymmetry of the modulation envelope. The asymmetry in turn reduces the residual AM envelope on the optical signal and increases the second harmonic, which can be used to drive the modulator bias point back toward quadrature. In the third operating scenario, in which the modulator is operating slightly below the quadrature point, the asymmetry in the modulation envelope has the opposite polarity, and therefore the residual second harmonic of the AM envelope is of correspondingly opposite polarity and also drives the modulator bias point back toward quadrature.

Figure 5:
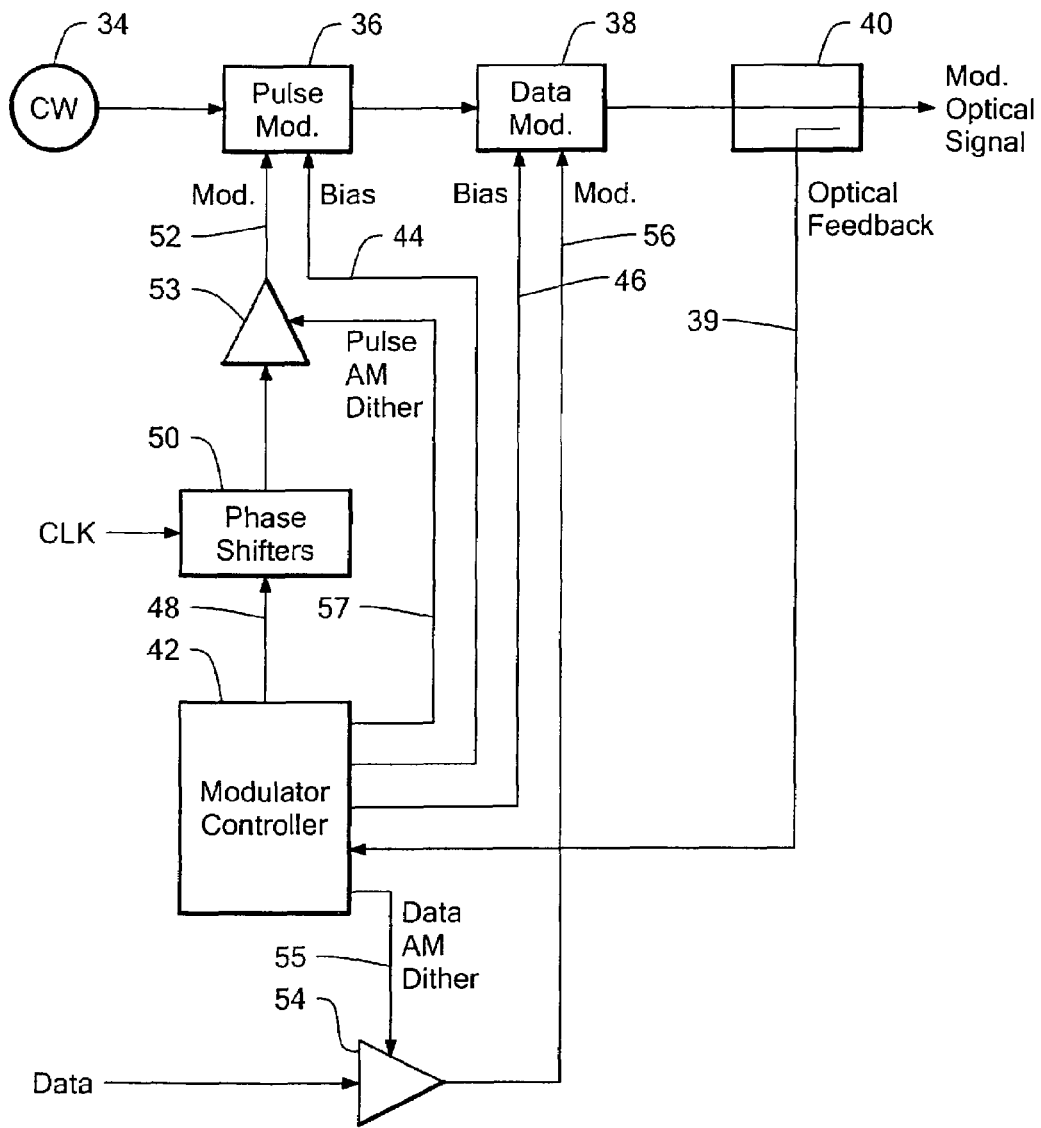
FIG. 5 is a block diagram of an optical transmitter in accordance with the present invention.

FIG. 5 shows a block diagram of an optical transmitter employing optical modulator control in accordance with the present invention. Referring to FIG. 5, continuous wave (CW) light is produced by a laser 34 and passed through a Pulse Modulator (PM) 36 for producing a series of optical pulses and a Data Modulator (DM) 38 to gate the pulses with the data. The PM 36 can be omitted for NRZ or DPSK modulation. A portion of the modulated optical signal (shown as optical feedback 39) is split off from the transmitter output by an optical coupler 40 and provided to a modulator controller 42.

The modulator controller 42 provides bias control to the PM 36 by means of a pulse bias control signal 44 and to the DM 38 by means of a data bias control signal 46. The modulator controller 42 also generates a phase control signal 48 to control the operation of phase shifters 50, which generate a pulse signal 52 for the PM 36 (via pulse amplifier 53) by phase shifting a reference clock CLK. The serial data signal is amplified by a data amplifier 54 and applied to the modulation input of the DM 38. The modulator controller also generates a data amplitude modulation (AM) signal 55 provided to the data amplifier 54, and a pulse AM signal 57 provided to the pulse amplifier 53.

Generally, the modulator controller 42 monitors the output optical power via the optical feedback signal 39 and maintains a desired value of the data bias signal 46 for the DM 38. For RZ modulation formats, the modulator controller 42 also simultaneously maintains a desired value of the pulse bias signal 44 for the PM 36, and controls the phase relationship between the pulse signal 52 and the data signal 56 via the phase control signal 48.

The modulator controller 42 sets the bias signals 44 and 46 and the phase control signal 48 using a series of dithers to produce and maintain an optimal optical waveform over temperature, aging and other drifts. The optical waveform is optimal in the sense that it produces the lowest bit error rate (BER) at the receiver. The dithers produce a correlated change, or fluctuation, in optical output power that the modulator controller 42 can detect via the coupler 40 and can use to control the transmitter. In one embodiment, the dithers produce a minimum correlated fluctuation in output optical power at the optimal operating point, which minimizes the effect of the dithers on the transmitter output and also provides maximum immunity to component variances in the control system. In the illustrated embodiment, the dithers are sinusoidal, and only the fundamental component of the optical power fluctuation is recovered and used for feedback. A single low bandwidth photo detector and low bandwidth electrical receiver are used for controlling all three parameters (PM bias, DM bias, and phase), reducing complexity and cost in comparison to the prior art.

Figure 6:
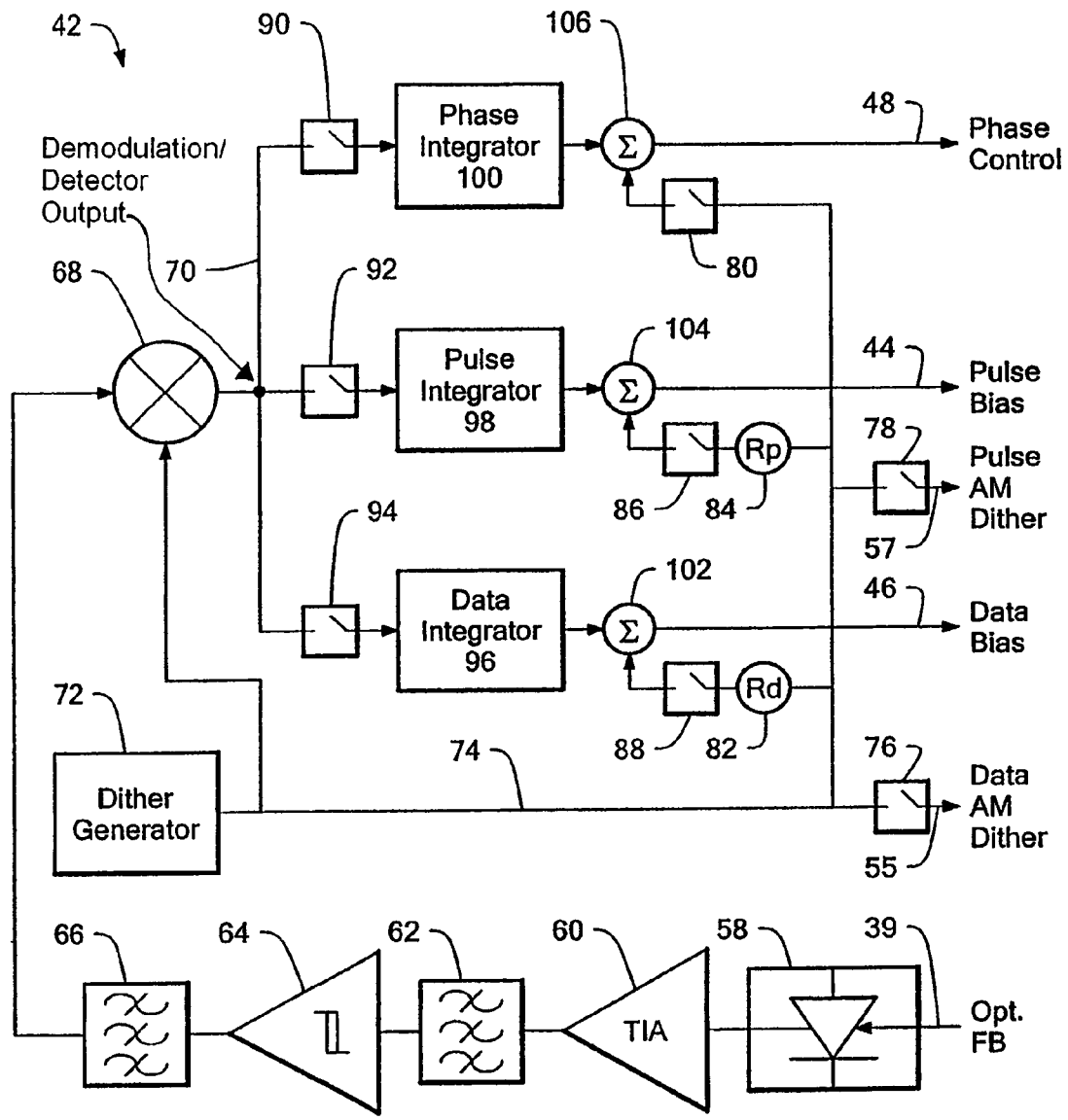
FIG. 6 is a block diagram of a modulator controller in the optical transmitter of FIG. 5.

FIG. 6 shows the modulator controller 42. In the feedback path, the optical feedback signal 39 is detected by a photo detector 58 and amplified by a transimpedance amplifier (TIA) 60 to produce a voltage proportional to the optical output power. This voltage is filtered by a bandpass filter 62 tuned to the fundamental frequency of the dither tones. The recovered fundamental tones are then passed through a limiting amplifier 64, and any harmonics produced by the limiting process are removed by a second bandpass filter 66. The output of the limiting amplifier 66 is provided to a coherent detector 68, which generates a DC error signal 70 that is proportional to the strength of the residual dither. The polarity of the error is dependent on the phase of the residual dither relative to the reference dither.

The limiting amplifier 64 has high linear gain when the control is in steady state and the residual dithers are small, giving accurate bias point control. During convergence, the residual dither tones are high and the limiting amplifier 64 is saturated. Nevertheless, even during convergence, the limiting amplifier 64 maintains accurate phase. Only the phases of the residual dither tones are required for successful acquisition if convergence time is not a factor.

Fluctuations of output optical power as a function of the three control signals (pulse bias 44, data bias 46, and phase control 48) provide a three-dimensional basis on which the control system operates in the case of RZ, RZ-BPSK and RZ-DPSK modulation. The modulator controller 42 exercises control over the three control signals in a multiplexed fashion, i.e., feedback correction is applied to the three controls in turn, for example in a round robin fashion. Feedback correction is applied to each control signal during a corresponding dwell period, and the setting of the control signal at the end of the dwell period is maintained during the correction of the other two control signals. The multiplexing of the feedback control circuitry permits the application of all dithers in sequence at the same frequency. The dwell period is 50 milliseconds in the illustrated embodiment.

A dither generator 72 generates a master dither tone 74, which is provided to switches 76, 78 and 80 and to variable gain blocks 82 and 84 (labeled "Rd" and "Rp" respectively). Additional switches 86, 88, 90, 92 and 94 are provided for the above-described multiplexed control scheme. The modulator controller 42 further includes a data integrator 96, pulse integrator 98, and phase integrator 100, along with corresponding adders 102, 104 and 106.

During feedback correction of the data bias signal 46, the switches 94 and 88 are closed, so that the error signal 70 is provided to the data integrator 96 and the output of Rd gain block 82 is provided to adder 102. For NRZ modulation, switch 76 is also closed, so that AM dither is applied to the data modulation input of the DM 38. For BPSK or DPSK modulation, switch 76 is open. For NRZ, BPSK and DPSK modulation, all the other switches (i.e., switches 86, 80, 78, 90 and 92) are open. Similarly, during feedback correction of the pulse bias signal 44, only the switches 92, 86 and optionally 78 are closed, so that the error signal 70 is provided to the pulse integrator 98 and the output of Rp gain block 84 is provided to adder 102. Switch 78 may be open or closed for different effects with respect to carrier suppression, as described below. Finally, during feedback correction of the phase control signal 48, only the switches 90 and 80 are closed, so that the error signal 70 is provided to the phase integrator 100 and the master dither signal is provided to adder 106. In each case, integration of the error signal 70 produces a corresponding correction signal which is provided as one input to the corresponding adder 102, 104 or 106. Each adder in turn sums the input correction signal with the dither signal from the dither generator 72 (scaled by Rd and Rp for data and pulse bias, respectively). During each dwell period, negative feedback drives the error signal 70 to zero and brings the corresponding control signal to the desired value. Operation of the three different feedback mechanisms is described below.

I. Data Modulator Bias

1. NRZ Modulation

Figure 7:
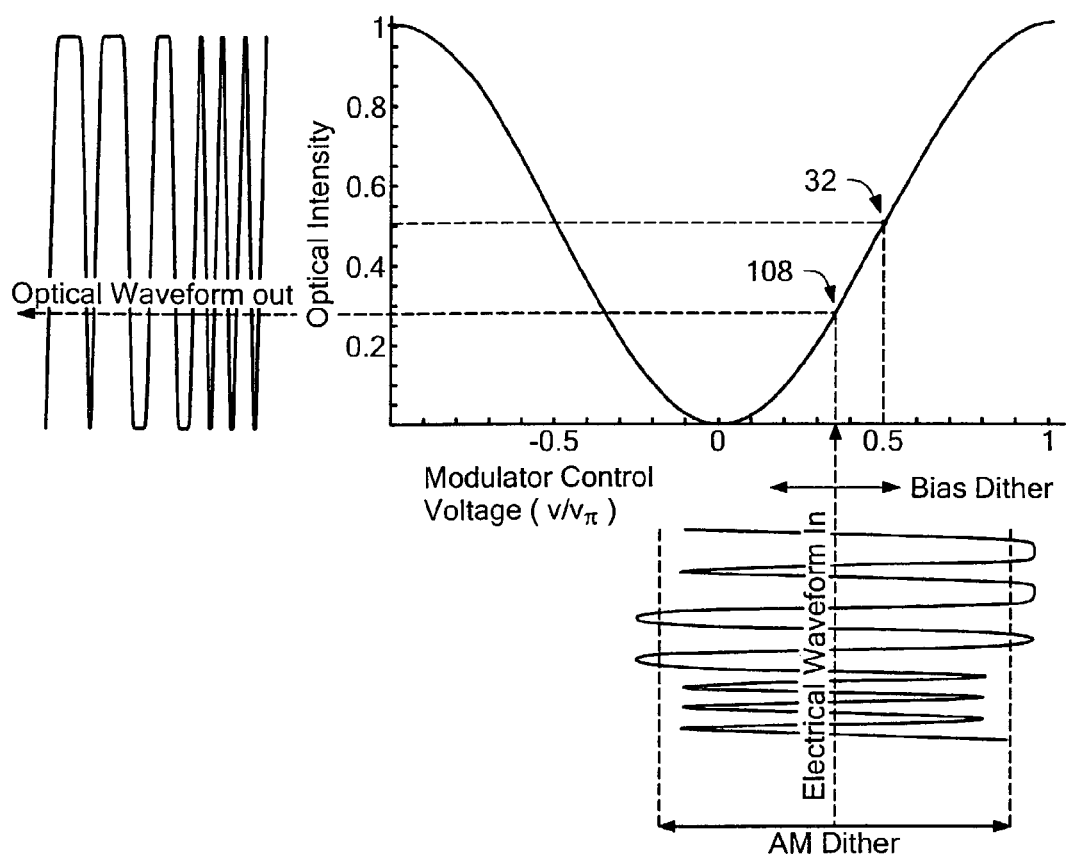
FIG. 7 is a plot showing a positive slope bias point for NRZ data modulation in the transmitter of FIG. 5.

For NRZ operation, the bias point for the DM 38 is generally offset from the quadrature point 32 to achieve the lowest bit error rate (BER) across the optical link to which the transmitter is coupled. An offset bias point generally produces a better "extinction ratio" in the optical signal, which is defined as the ratio of the "on" signal power to the "off" signal power. An offset bias point also results in superior optical phase characteristics and permits the use of relatively inexpensive amplifiers 54 whose output drive levels may be less than the full range of the modulation input of the DM 38. The modulator transfer function and an offset bias point 108 for positive slope operation are shown in FIG. 7. Operation on the negative slope can be accommodated in the control system by simple inversion of the dither tone.

Bias point control is achieved by applying an amplitude dither to the modulation input of DM 38 while simultaneously applying a second correlated dither to the bias input of the DM 38. Under these circumstances, it can be shown that the ratio of the amplitude of the modulation dither to the bias dither determines the offset of the bias point 108 from the quadrature point 32. In the illustrated embodiment, this ratio is established by the Rd gain block 82. When Rd is equal to 0, the DC component of the data bias signal 46 is equal to $0.5(V_\pi)$, establishing operation at the quadrature point 32. As Rd increases from 0, the bias point 108 moves down the positive slope of the transfer curve toward the point of minimum output power, and as Rd decreases from 0, the bias point 108 moves up the positive slope of the transfer curve toward the point of maximum output power. In general, it can be shown that the DC bias point 108 is offset from the quadrature point by a voltage $vb_d$ which is a function of the arctangent of the gain constant Rd.

$$vb_d = -\tan^{-1}(k\, Rd)$$

where k is a constant associated with the optical waveform shape.

2. BPSK and DPSK Modulation

Figure 8:
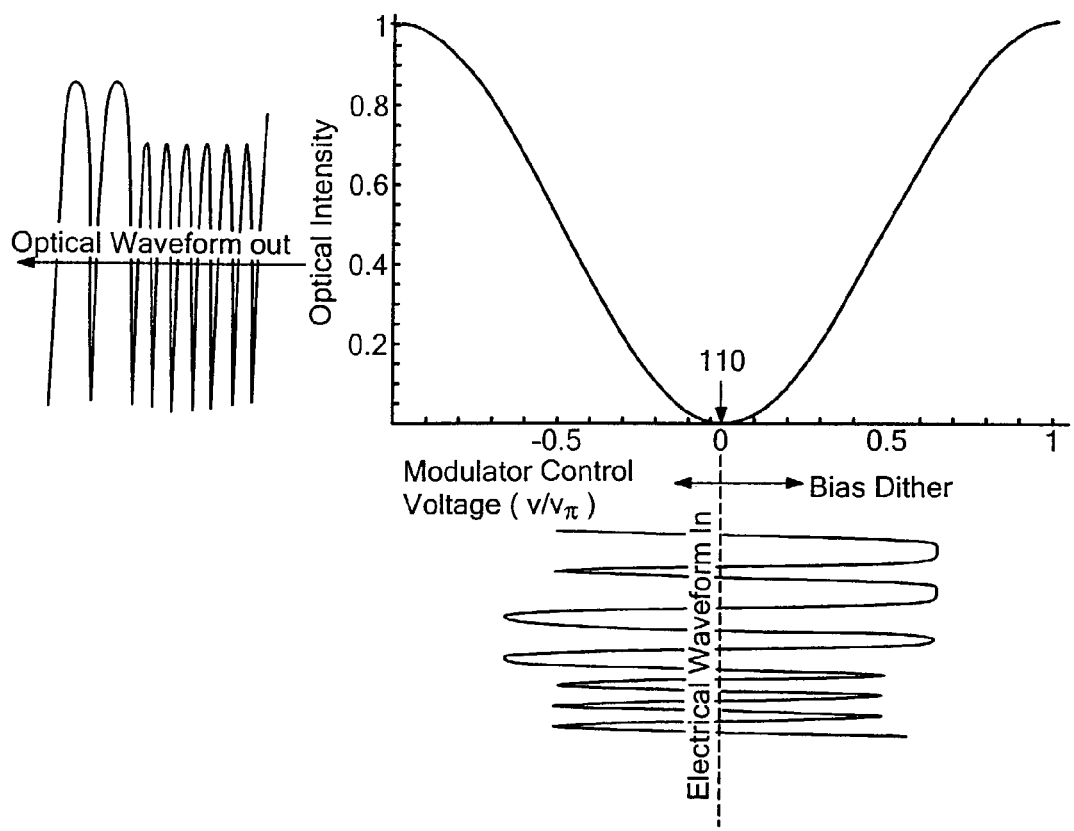
FIG. 8 is a plot depicting a bias point for BPSK or DPSK data modulation in the transmitter of FIG. 5.

The DM 38 generates BPSK or DPSK optical modulation when driven symmetrically about a bias point near 0 such as the bias point 110 as shown in FIG. 8. Referring to FIG. 6, the Rd gain control 82 is set to unity and the bias dither is applied to the bias input of the DM 38 through switch 88 and adder 102. The switch 76 is open, so that no AM dither is applied to the data amplifier 54. The output power fluctuation induced by the bias dither is minimized by the same feedback loop used for NRZ modulation (described above). Under these conditions, it can be shown that the control voltage at the bias point 110 is maintained at zero volts.

It should be noted that the output power fluctuation will have a natural null when the peak-to-peak level of the modulating electrical signal 56 is around 1.4 ($V_\pi$). Therefore, for proper operation, the peak-to-peak level must be either greater than or less than 1.4 ($V_\pi$) to maintain feedback. Also, because of the null, the polarity of the feedback in an embodiment having a peak-to-peak level greater than 1.4 ($V_\pi$) will be opposite the polarity of the feedback in an embodiment having a peak-to-peak level less than 1.4 ($V_\pi$). These differences can be addressed by applying the bias dither in one sense (e.g., positive with respect to a separate reference signal) in one case and in the opposite sense (e.g., negative with respect to the separate reference signal) in the other.

II. Pulse Modulator Bias

The pulse modulator or PM 36 is used to generate RZ optical pulses. The pulse signal 52 used to modulate the PM 36 is an approximately sinusoidal waveform having a constant frequency phase locked to the data signal 56. The bias signal 44 can be maintained at one of different values depending on the desired characteristics of the RZ pulse train. In all cases, the desired value of the bias signal 44 is maintained by the above-described feedback loop.

In the first two cases, the biasing resembles the biasing for BPSK or DPSK as described above. In particular, there is no AM applied to the pulse signal 52. The bias signal 44 may be maintained at zero volts, establishing the operating point of the PM 36 at the null in the modulator transfer characteristic. The pulse signal 52 is at half the baud rate of the data signal 56. In this case, the RZ pulse stream will exhibit carrier suppression, i.e., there will be substantially no energy at the carrier frequency in the modulated optical spectrum. Such a carrier-suppressed RZ modulation format may be particularly desirable for certain type of transmission links. In the second case, the bias signal 44 may be maintained at $V_\pi$, which establishes the operating point of the PM 36 at the maximum in the transfer characteristic. The pulse signal 52 is at half the baud rate of the data signal 56. Additionally, the "on" drive level of the pulse signal 52 is equal to $V_\pi$. In this case, the RZ pulse stream will not exhibit carrier suppression, which may be advantageous for other transmission links.

The third case is similar to the biasing of the DM 38 for NRZ data transmission. Co-incident dithers are applied to both the amplitude of the pulse signal 52 and to the bias signal 44, and the pulse gain $R_p$ in gain block 84 is set to a desired value to bias the PM 36 at the desired offset from quadrature. The pulse signal 52 is at the baud rate of the data signal 56.

III. Phase Control—Synchronization of Pulse and Data

Figure 9:
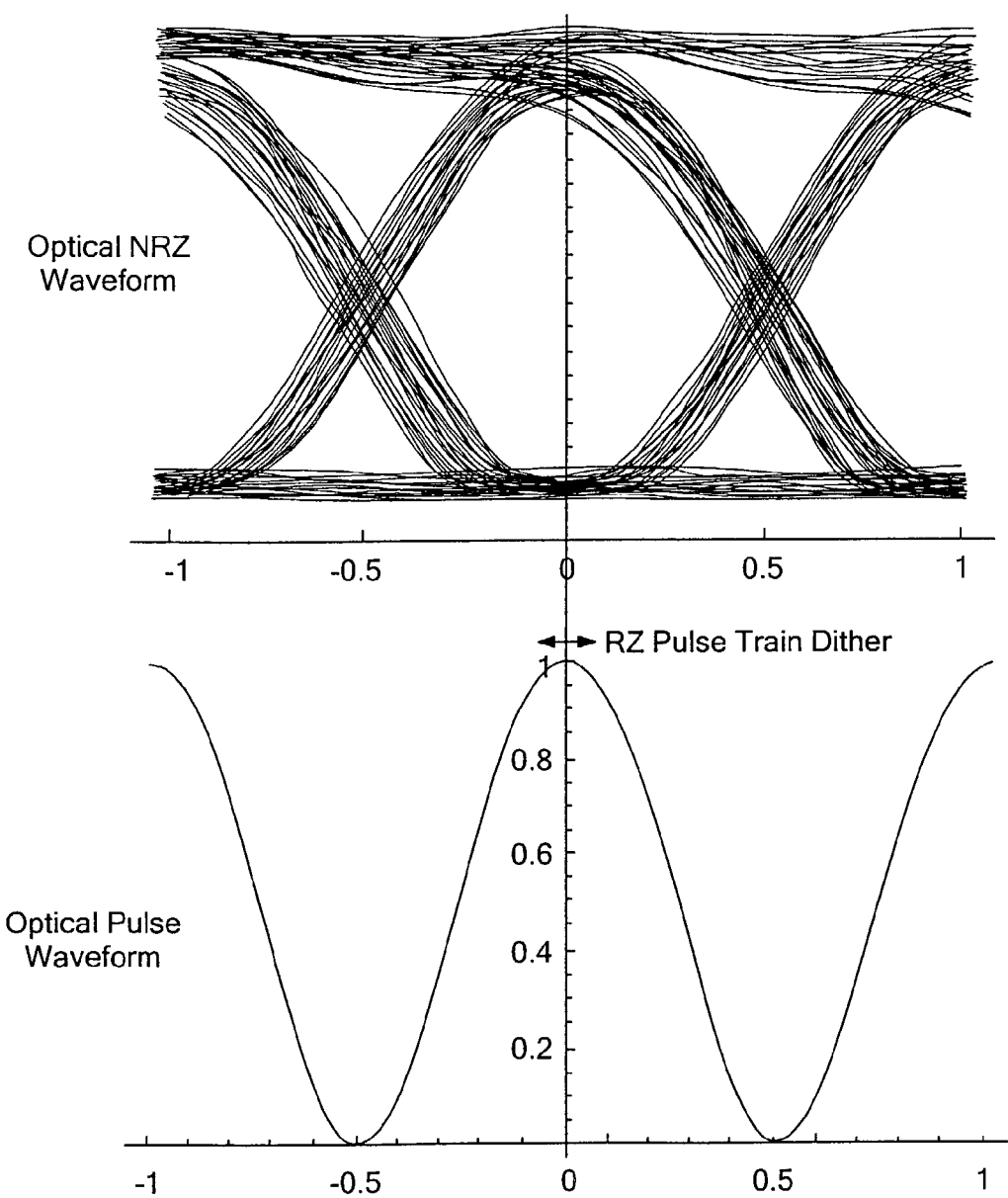
FIG. 9 is a plot illustrating data and pulse alignment for RZ modulation in the transmitter of FIG. 5.
Figure 10:
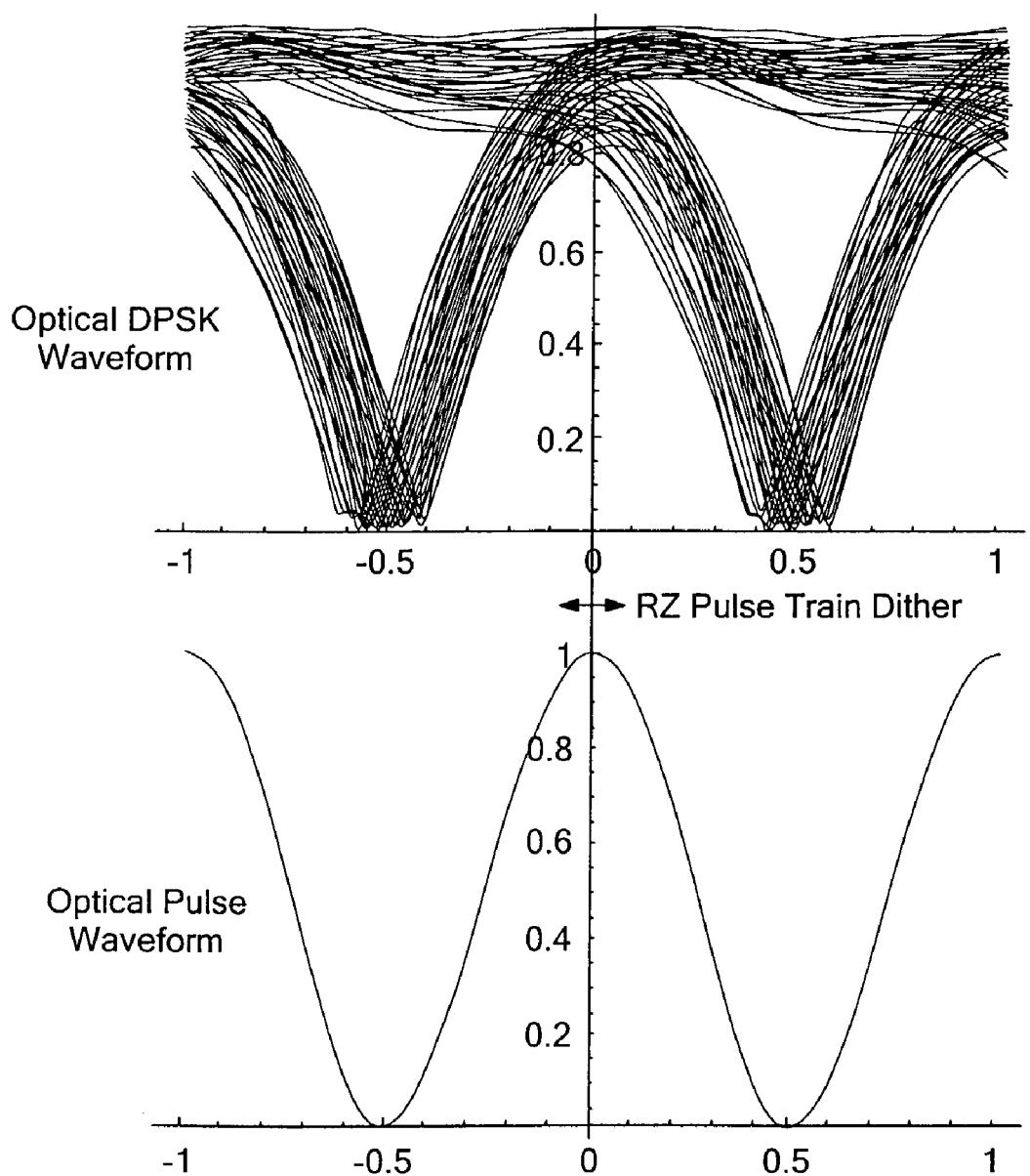
FIG. 10 is a plot illustrating data and pulse alignment for RZ-BPSK or RZ-DPSK modulation in the transmitter of FIG. 5.

The optimal phase setting between the RZ pulses and the data modulation occurs when the RZ pulse train is centered in the data modulation eye pattern. To achieve this setting, a small phase modulation is applied to either the RZ pulse train or the data modulation signal, which has the effect of moving the RZ pulse train in time relative to the data modulation. This is illustrated in FIG. 9 for RZ and FIG. 10 for RZ-BPSK or RZ-DPSK.

In general, the phase modulation causes a small optical output power fluctuation correlated to the phase modulation, which has a null at the point when the RZ pulse train is centered in the data modulation eye if the data modulation eye has temporal symmetry about the eye center. A feedback system is used to maintain the waveform alignment at this point. The principle applies to all optical data waveforms except those with a null at exactly the baud rate in their power spectral densities. Such waveforms produce no output power fluctuation correlated to the phase modulation and so a feedback signal cannot be derived. The latter class of waveforms exhibit certain amplitude and temporal symmetries about the eye center and are most likely to arise with an NRZ electrical signal that has symmetric one and zero symbol excursions about the average voltage, equal rise and fall times and a data modulator with rotational symmetry about the bias point. These symmetries can be eliminated in an NRZ system by the above-described operation at an off-quadrature bias point 108, or by applying an asymmetric NRZ electrical signal 56 at the quadrature bias point, or both. A data modulator 38 with asymmetric transfer characteristics can also induce the requisite NRZ asymmetry. BPSK and DPSK waveforms can only exhibit such symmetry with zero transition time between symbols, which is not a practical limitation.

It is noted that the polarity of the output power fluctuation is dependent on the specific data modulation waveform shape and must be taken into account for stable loop operation. Also, the phase modulation is applied at a low level and a low frequency such that the residual dither at the output of the transmitter falls within the tracking bandwidth of the receiver data recovery circuitry and does not introduce excessive jitter.

Figure 11:
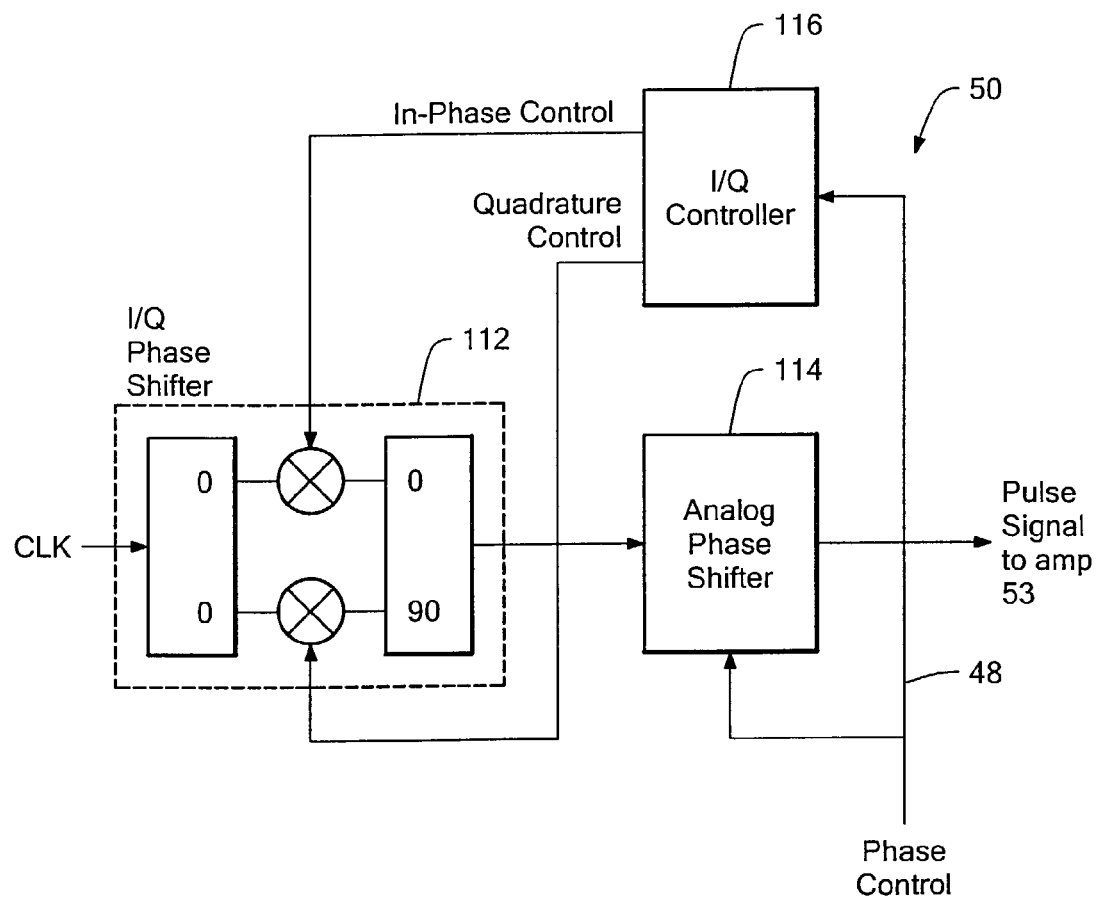
FIG. 11 is a block diagram of a set of phase shifters in the optical transmitter of FIG. 5.

Before the pertinent operation of the modulator controller 42 is described, the phase shifters 50 are described with reference to FIG. 11. The clock CLK is applied to an in-phase/quadrature (I/Q) phase shifter 112, whose output is applied to an analog phase shifter 114 controlled by the phase control signal 48. Associated with the I/Q phase shifter 112 is an I/Q controller 116, which also receives the phase control signal 48 and generates in-phase and quadrature control signals for the I/Q phase shifter 112. The output of the analog phase shifter 114 is the pulse signal provided to the pulse amplifier 53 to generate the modulation input for the PM 36 (FIG. 5).

The combination of the two phase shifters 112 and 114 provides for separate coarse and fine control over the amount of phase shift, yielding a wide range of adjustability with minimization of undesirable phase jitter. The analog phase shifter 114 provides a precisely-controlled amount of phase shift over a relatively small interval, while the I/Q phase shifter 112 has the well-known property of being able to continuously adjust phase without reaching a phase shift limit. The I/Q controller 116 adjusts the I/Q phase shifter 112 slowly compared to the analog phase shifter 114, tending to maintain the operation of the analog phase shifter 114 near the center of its range. The order of the phase shifters is not important. The use of two phase shifters is an optimization. Alternative embodiments could employ either an analog phase shifter with sufficient range or an I/Q phase shifter that can be phase modulated. The I/Q phase shifter can also take other forms than that shown in FIG. 11.

In the feedback loop described with reference to FIG. 6 above, the phase dithering produces a corresponding amplitude envelope on the modulated optical signal that exhibits a null and phase inversion when the phase offset between the RZ pulse stream and the NRZ, BPSK or DPSK data stream is zero. The feedback loop forces operation at this null, precisely aligning the RZ pulses in the center of the data eye pattern.

Figure 12:
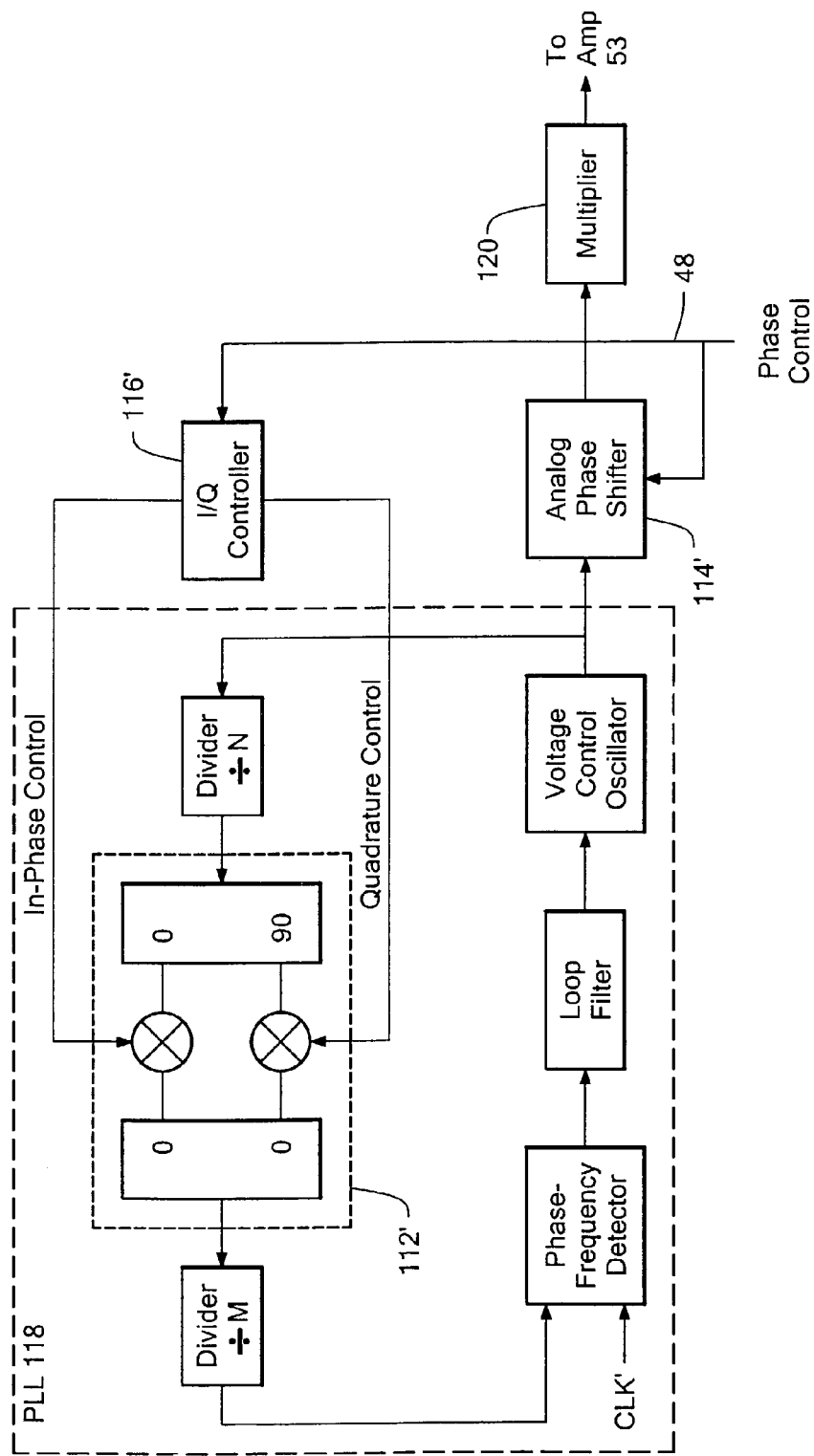
FIGS. 12 and 13 are block diagrams of alternative sets of phase shifters for use in an optical transmitter such as the optical transmitter of FIG. 5.
Figure 13:
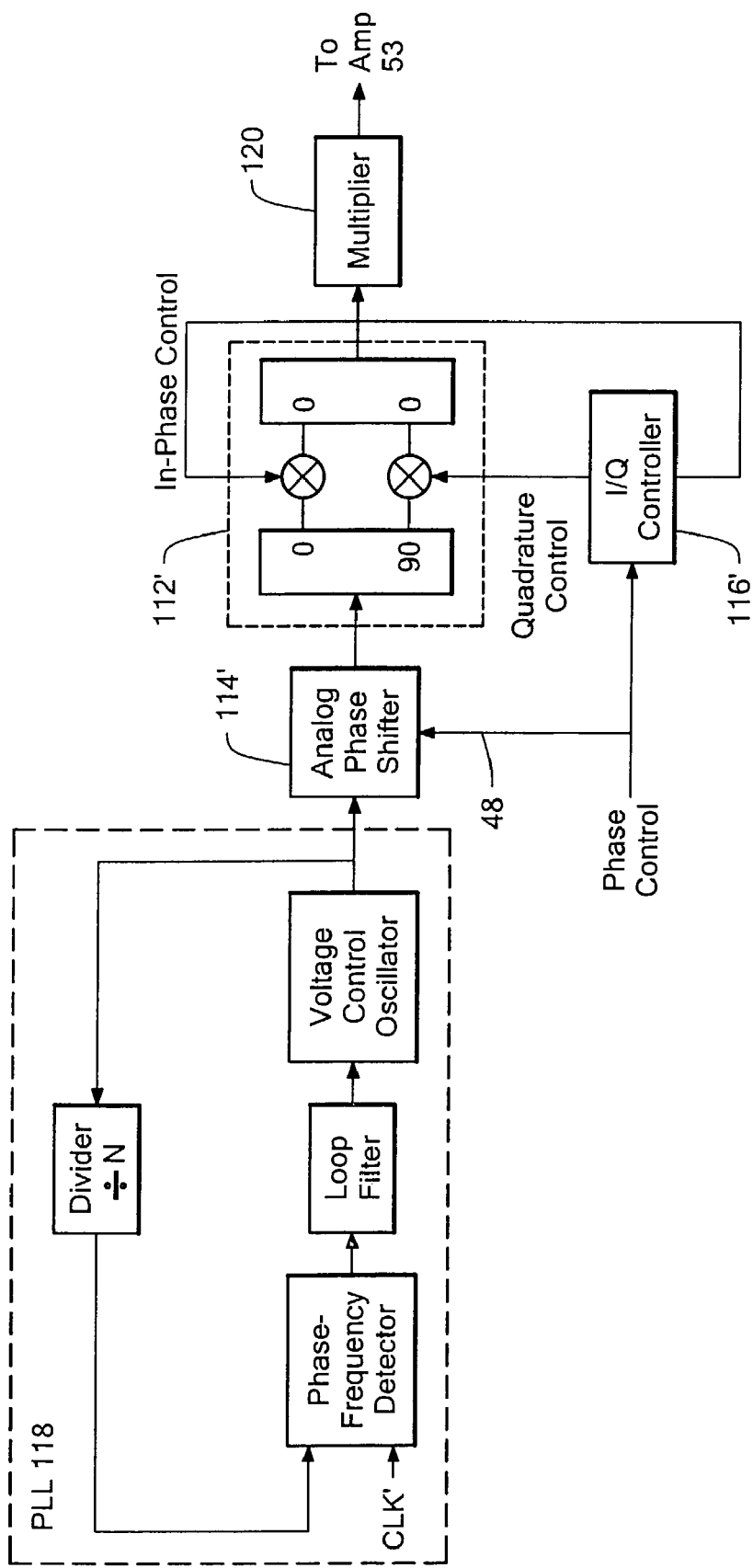

FIGS. 12 and 13 show alternative arrangements for the phase shifters 50 of FIG. 5, which include phase-lock-loop circuitry 118 and multipliers 120 for synthesizing the high-frequency RZ pulse stream from a lower-frequency clock CLK'. In a 40 Gb/s transmitter, for example, a 40 GHz pulse stream can be obtained from a 2 GHz clock, which permits the use of more inexpensive components. FIG. 12 shows the I/Q phase shifter 112' in the reverse or feedback path of the synthesizer, while FIG. 13 shows the I/Q phase shifter 112' in the forward path of the synthesizer. Separation of the RZ pulse train synthesis from the data modulation path and other noisy components provides for very low timing jitter, which can enable optical transmission over relatively long distances.

Figure 14:
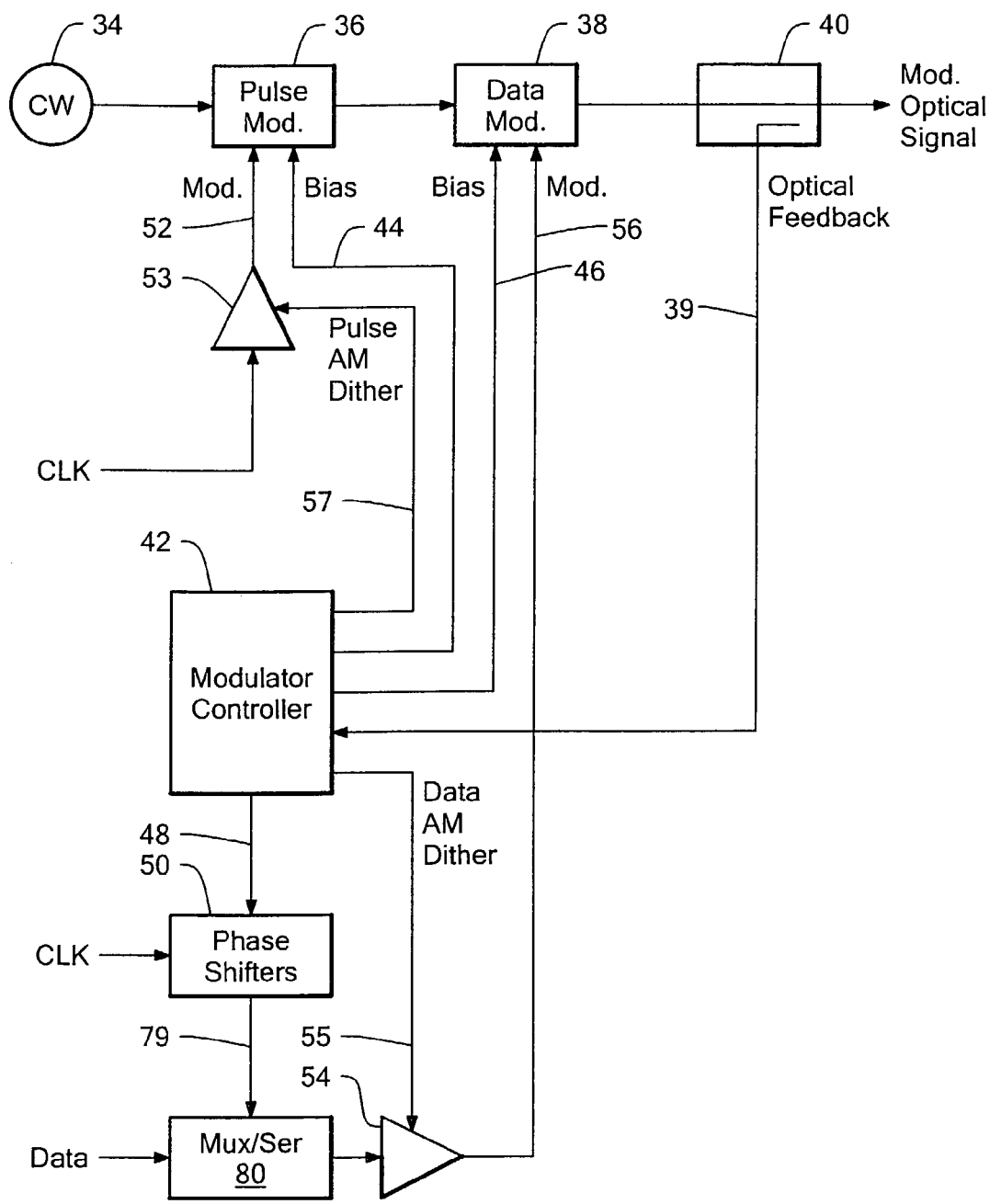
FIG. 14 is a block diagram of an alternative embodiment of an optical transmitter in accordance with the present invention.

FIG. 14 shows an alternative transmitter in which phase modulation is applied to the data signal 56 rather than to the pulse signal 52. In the illustrated embodiment, a multiplexer/serializer 80 is employed to generate the serial data stream 56 from a stream of parallel data words. The pulse signal 52 is generated directly from the clock signal CLK, without introduction of any phase modulation as in the embodiment of FIG. 5. Instead, the phase shifters 50 apply phase modulation to the clock signal CLK to generate a serializer reference clock 79, which is supplied to the multiplexer/serializer 80 to control the timing operation thereof. As a result, the data signal 56 exhibits phase modulation with respect to the pulse signal 52, enabling the above-described operation of the feedback loop to align the data and pulse components of the modulated optical signal.

With reference to the multiplexed nature of controlling the bias signals 44 and 46 and the phase control signal 48 of FIGS. 5 and 6, an alternate method of controlling these signals could employ orthogonal dither tones so that each control signal could be feedback-corrected at the same time. Such orthogonal dithers could be realized as dithers of different frequencies or dithers at the same frequency but in quadrature (at 90 degrees) with respect to each other. Additionally, the order of the PM 36 and DM 38 may be reversed in alternative embodiments.

Furthermore, the presently disclosed control system may be implemented in different ways. The low frequency electronic processing in the modulator controller 42 is suited to a Digital Signal Processing (DSP) in a micro-controller device, a traditional Central Processing Unit (CPU), or analog circuitry. Alternative implementations of the control system may examine the harmonics of the dithers introduced in the optical path rather than the fundamentals, or use non-sinusoidal dithers. The optical modulators may be implemented using many different techniques and materials, such as Mach-Zehnder or Electro-Absorption (EA). Modulator bias control is typically applied to separate bias control electrodes on the modulator sections, although it is possible in alternative embodiments to sum the bias control with the high-speed pulse and data waveforms. Differential controls are also common on high-speed modulators where true and complement versions of a control signal are applied to a modulator simultaneously. Such variants are not specifically shown in the Figures for clarity, but fall within the scope of the disclosed technique.

It will be apparent to those skilled in the art that other modifications to and variations of the disclosed methods and apparatus are possible without departing from the inventive concepts disclosed herein, and therefore the invention should not be viewed as limited except to the full scope and spirit of the appended claims.

What is claimed is:

1. A method of operating an optical modulator, comprising:
   modulating a data input signal of an optical modulator with a first dither signal to generate a modulated optical signal, the first dither signal being applied to an amplifier to modulate the respective data input signal;
   demodulating the modulated optical signal to generate an error signal;
   multiplying the first dither signal by a gain factor to produce a second dither signal, the gain factor value influencing a desired bias point of operation;
   deriving a bias input signal of the optical modulator from the error signal; and
   applying the second dither signal to the bias input signal to contribute to establishing a desired bias point of operation of the optical modulator.

2. A method according to claim 1, wherein the desired bias point is in a range between a minimum and maximum, and is other than a quadrature point of a transfer characteristic of the optical modulator.

3. A method according to claim 1, wherein the desired bias point is a minimum in a transfer characteristic of the optical modulator.

4. A method according to claim 1, wherein the optical modulator comprises a Mach Zehnder modulator.

5. A method according to claim 1, wherein generating the error signal comprises:
   demodulating a sampled portion of the modulated optical signal coherently with the first dither signal to generate a detector output signal; and
   integrating the detector output signal.

6. A method according to claim 5, wherein demodulating the sampled portion of the modulated optical signal comprises converting the sampled portion of the modulated optical signal to an electrical signal proportional to the power of the modulated optical signal in a narrow band surrounding the fundamental frequency of the first dither signal.

7. A method according to claim 1, wherein deriving the bias input signal for the optical modulator comprises:
   integrating the error signal to produce a correction signal; and
   summing correction signal with the second dither signal.

8. A method according to claim 1, wherein the frequency of the first dither signal is about 3 KHz.

9. A method according to claim 1, wherein the respective frequencies of the first and second dither signals are equal.

10. A method according to claim 1, wherein the first and second dither signals are sinusoidal.

11. A method according to claim 1, wherein the optical modulator is a first optical modulator cascaded with a second optical modulator and wherein the modulated optical signal is a return to zero (RZ) modulated optical signal, and further comprising:
    modulating a phase control signal with a third dither signal;
    phase modulating a pulse signal in accordance with the phase control signal and supplying the phase modulated pulse signal to the second optical modulator;
    generating a phase error signal from the modulated optical signal; and
    deriving the phase control signal from the phase error signal to phase align the pulse signal with a data signal supplied to the first modulator.

12. A method according to claim 1, wherein the optical modulator is a first optical modulator cascaded with a second optical modulator and wherein the modulated optical signal is a return to zero (RZ) modulated optical signal, and further comprising:
    modulating a phase control signal with a third dither signal;
    phase modulating a data signal in accordance with the phase control signal and supplying the phase modulated data signal to the first optical modulator;
    supplying a pulse signal to the second optical modulator;
    generating a phase error signal from the modulated optical signal; and
    deriving the phase control signal from the phase error signal to phase align the data signal with the pulse signal.

13. A method according to claim 1, wherein the modulated optical signal is generated in accordance with the bias input signal as a first control signal and in accordance with at least a second control signal, and further comprising successively deriving the first and second control signals from the modulated optical signal in successive intervals.

14. A method of operating an optical modulator at a desired bias point, comprising:
    amplitude modulating a data signal with an amplifier according to a first dither signal selectively applied to the amplifier, and supplying the amplitude modulated data signal to the optical modulator to generate a modulated optical signal, the optical modulator being biased in accordance with a modulator bias signal;
    demodulating a sampled portion of the modulated optical signal coherently with the first dither signal to generate a detector output signal;
    integrating the detector output signal to generate a correction signal; and
    summing the correction signal with a second dither signal to generate the modulator bias signal, the second dither signal being produced by multiplying the first dither signal by a gain factor effective to establish the desired bias point for the modulator.

15. A method of operating first and second optical modulators cascaded to generate a return to zero (RZ) modulated optical signal, the first optical modulator performing modulation in accordance with a pulse signal and the second optical modulator performing modulation in accordance with a data signal, the method comprising:
    phase modulating the pulse signal in accordance with a phase control signal, the phase control signal being dithered in accordance with a phase dither signal;
    amplitude modulating the pulse signal with an amplifier controlled with a pulse dither signal and supplying the phase and amplitude modulated pulse signal to the first modulator;
    modulating a bias input of the second optical modulator with a bias dither signal;
    generating an error signal from the modulated optical signal; and
    deriving the phase control signal from the error signal to phase align the pulse signal with the data signal.

16. A method according to claim 15, wherein phase modulating the pulse signal comprises:
    applying a coarse phase shift in accordance with a substantially DC component of the phase control signal; and
    applying a finer phase shift in accordance with a substantially AC component of the phase shift signal.

17. A method according to claim 16, wherein applying the coarse phase shift comprises in phase/quadrature phase shifting, and applying the finer phase shift comprises analog phase shifting.

18. A method according to claim 17, further comprising synthesizing the pulse signal from a lower frequency pulse signal, and wherein the in phase/quadrature phase shifting is included in the synthesizing of the pulse signal.

19. A method according to claim 17, further comprising synthesizing the pulse signal from a lower frequency pulse signal, and wherein the in phase/quadrature phase shifting is performed after the synthesizing of the pulse signal.

20. A method according to claim 15, wherein the first optical modulator precedes the second optical modulator.

21. A method according to claim 15, wherein generating the error signal comprises demodulating a sampled portion of the RZ modulated optical signal coherently with the phase dither signal.

22. A method according to claim 15, wherein deriving the phase control signal comprises:
   integrating the error signal to generate a phase correction signal; and
   summing the phase correction signal with the phase dither signal.

23. A method according to claim 15, further comprising:
   modulating a data input signal of the second optical modulator with a data dither signal;
   generating a bias error signal from the modulated optical signal; and
   deriving the bias input signal of the second optical modulator from the bias error signal to establish a desired bias point of operation of the second optical modulator.

24. A method according to claim 15, wherein the RZ modulated optical signal is generated in accordance with the phase control signal as a first control signal and in accordance with at least a second control signal, and further comprising successively deriving the first and second control signals from the RZ modulated optical signal in successive intervals.

25. A method according to claim 15, wherein operating the first optical modulator comprises biasing the first optical modulator at a bias point other than a quadrature point of the first optical modulator.

26. A method according to claim 15, wherein operating the second optical modulator comprises driving the second optical modulator with an asymmetric version of the data signal.

27. A method according to claim 15, wherein operating the second optical modulator comprises using a data modulator with an asymmetric transfer characteristic.

28. A method of operating first and second optical modulators cascaded to generate a return to zero (RZ) modulated optical signal, the first optical modulator performing modulation in accordance with a data signal and the second optical modulator performing modulation in accordance with a pulse signal, the method comprising:
   phase modulating the data signal in accordance with the phase control signal and supplying the phase modulated data signal to the first modulator, the phase control signal being dithered in accordance with a phase dither signal;
   amplitude modulating a data input of the first optical modulator with an amplifier controlled with a data dither signal;
   generating an error signal from the modulated optical signal; and
   deriving the phase control signal from the error signal to phase align the pulse signal with the data signal.

29. A method according to claim 28, wherein the data signal is generated by a data serializer operating on a data serializer reference clock, and wherein phase shifting the data signal comprises applying phase shift to the data serializer reference clock.

30. A method according to claim 29, wherein phase shift comprises:
   applying a coarse phase shift in accordance with a substantially DC component of the phase control signal; and
   applying a finer phase shift in accordance with a substantially AC component of the phase shift signal.

31. A method according to claim 30, wherein applying the coarse phase shift comprises in phase/quadrature phase shifting, and applying the finer phase shift comprises analog phase shifting.

32. A method according to claim 28, wherein the first optical modulator precedes the second optical modulator.

33. A method according to claim 28, wherein generating the error signal comprises demodulating a sampled portion of the RZ modulated optical signal coherently with the phase dither signal.

34. A method according to claim 28, wherein deriving the phase control signal comprises:
   integrating the error signal to generate a phase correction signal; and
   summing the phase correction signal with the phase dither signal.

35. A method according to claim 28, further comprising:
   modulating a bias input signal of the first optical modulator with a bias dither signal, the data and bias dither signals having a predetermined relationship;
   generating a bias error signal from the modulated optical signal; and
   deriving the bias input signal of the first optical modulator from the bias error signal to establish a desired bias point of operation of the first optical modulator.

36. A method according to claim 28, wherein the RZ modulated optical signal is generated in accordance with the phase control signal as a first control signal and in accordance with at least a second control signal, and further comprising successively deriving the first and second control signals from the RZ modulated optical signal in successive intervals.

37. A method according to claim 28, wherein operating the first optical modulator comprises biasing the first optical modulator at a bias point other than a quadrature point of the first optical modulator.

38. A method according to claim 28, wherein operating the first optical modulator comprises driving the first optical modulator with an asymmetric version of the data signal.

39. A method according to claim 28, wherein operating the first optical modulator comprises using a data modulator with an asymmetric transfer characteristic.

40. A method of controlling a plurality of modulation characteristics of a modulated optical signal, comprising:
   generating the modulated optical signal in accordance with a plurality of control signals, each control signal being selectively generated exclusively in different successive non-overlapping control intervals, each control signal being associated with a corresponding one of the plurality of modulation characteristics;
   generating a detector output signal from the modulated optical signal;
   integrating the detector output signal to generate a correction signal for the modulation characteristic associated with the control interval; and
   summing the correction signal with a corresponding one of dither signals to generate the control signal for the modulation characteristic associated with the control interval.

41. A method according to claim 40, wherein the modulation characteristics include (i) the extinction ratio of the modulated optical signal, and (ii) the phase alignment between a return to zero pulse component and a non return to zero data component of the modulated optical signal.

42. A method of controlling a plurality of modulation characteristics of a modulated optical signal, comprising:

generating the modulated optical signal in accordance with a plurality of control signals, each control signal being associated with a corresponding one of the modulation characteristics;

demodulating a sampled portion of the modulated optical signal coherently with a first dither signal to generate a detector output signal; and during each of a plurality of intervals in a continually repeated control process, each interval being associated with a corresponding one of the modulation characteristics:

(i) integrating the detector output signal to generate a correction signal for the modulation characteristic associated with the interval;

(ii) summing the correction signal with a corresponding one of second dither signals to generate the control signal for the modulation characteristic associated with the interval, each second dither signal having a predetermined relationship to the first dither signal effective to produce a desired value of the associated modulation characteristic; and (iii) for each control signal other than the control signal generated in the current interval, maintaining a value of the control signal established in a preceding interval.

43. An optical transmitter, comprising:

an optical modulator operative to generate a modulated optical signal; and a modulator controller operative:

(i) to modulate data and bias input signals of the optical modulator with respective first and second dither signals, the modulator controller comprising a gain factor multiplier, the first dither signal being applied to the gain factor multiplier to produce the second dither signal;

(ii) to apply the first dither signal to an amplifier to modulate the respective data input signal;

(iii) to demodulate the modulated optical signal to generate an error signal;

(iv) to derive a bias input signal of the optical modulator from the error signal; and to apply the second dither signal to the bias input signal to contribute to establishing a desired bias point of operation of the optical modulator.

44. An optical transmitter according to claim 43, wherein the desired bias point is in a range between a minimum and a maximum, and is other than a quadrature point of a transfer characteristic of the optical modulator.

45. An optical transmitter according to claim 43, wherein the desired bias point is a minimum in a transfer characteristic of the optical modulator.

46. An optical transmitter according to claim 43, wherein the optical modulator is a Mach Zehnder modulator.

47. An optical transmitter according to claim 43, wherein the modulator controller comprises:

demodulation circuitry operative to demodulate a sampled portion of the modulated optical signal coherently with the first dither signal to generate the error signal;

an integrator operative to integrate the error signal to generate a correction signal; and an adder operative to sum the correction signal with the second dither signal.

48. An optical transmitter according to claim 47, wherein the demodulation circuitry comprises:

a photodetector operative to convert the sampled portion of the modulated optical signal to an electrical signal proportional to the power of the modulated optical signal; and a filter operative to filter the electrical signal in a narrow band surrounding the fundamental frequency of the first dither signal.

49. An optical transmitter according to claim 43, wherein the optical modulator is a first optical modulator cascaded with a second optical modulator and the modulated optical signal is a return to zero (RZ) modulated optical signal, and further comprising phase shifting circuitry operative to phase modulate a pulse signal in accordance with a phase control signal and supply the phase modulated pulse signal to the second optical modulator, and wherein the modulator controller is further operative:

(i) to modulate the phase control signal with a third dither signal;

(ii) to generate a phase error signal from the modulated optical signal; and (iii) to derive the phase control signal from the phase error signal to phase align the pulse signal with a data signal supplied to the first modulator.

50. An optical transmitter according to claim 43, wherein the modulated optical signal is generated in accordance with the bias input signal as a first control signal and in accordance with at least a second control signal, and wherein the modulator controller is further operative to successively derive the, first and second control signals from the modulated optical signal in successive intervals.

51. An optical transmitter, comprising:

first and second optical modulators cascaded to generate a return to zero (RZ) modulated optical signal; phase modulation circuitry operative to phase modulate at least one of a pulse signal or a data signal in accordance with a phase control signal, and further to amplitude modulate the pulse signal with an amplifier controlled with a pulse dither signal, the pulse signal being supplied to the first modulator and the data signal being supplied to the second modulator; and a modulator controller operative:

(i) to dither the phase control signal in accordance with a phase dither signal;

(ii) to dither a bias input of the second modulator in accordance with a bias dither signal;

(iii) to generate an error signal from the modulated optical signal; and (iv) to derive the phase control signal from the error signal to phase align the pulse signal with a data signal supplied to the second modulator.

52. An optical transmitter according to claim 51, wherein the phase shifting circuitry comprises:

an in phase/quadrature phase shifter operative to apply a coarse phase shift in accordance with a substantially DC component of the phase control signal; and an analog phase shifter operative to apply a finer phase shift in accordance with a substantially AC component of the phase shift signal.

53. An optical transmitter according to claim 52, wherein the phase shifting circuitry further comprises pulse synthesis circuitry operative to synthesize the pulse signal from a lower frequency pulse signal, and wherein the in phase/quadrature phase shifter is included in the pulse synthesis circuitry.

54. An optical transmitter according to claim 52, wherein the phase shifting circuitry further comprises pulse synthesis circuitry operative to synthesize the pulse signal from a lower frequency pulse signal, and wherein the in phase/quadrature phase shifter operates on an output of the pulse synthesis circuitry.

55. An optical transmitter according to claim 51, wherein the first optical modulator precedes the second optical modulator.

56. An optical transmitter according to claim 51, wherein the modulator controller comprises:
  demodulating circuitry operative to demodulate a sampled portion of the RZ modulated optical signal coherently with the phase dither signal to generate the error signal;
  an integrator operative to integrate the error signal to generate a correction signal; and
  an adder operative to sum the correction signal with the phase dither signal.

57. An optical transmitter according to claim 51, wherein the modulator controller is further operative:
  (i) to modulate data and bias input signals of the second optical modulator with respective second and third dither signals, the second and third dither signals having a predetermined relationship;
  (ii) to generate a bias error signal from the modulated optical signal; and
  (iii) to derive the bias input signal of the optical modulator from the bias error signal to establish a desired bias point of operation of the second optical modulator.

58. An optical transmitter according to claim 51, wherein the RZ modulated optical signal is generated in accordance with the phase control signal as a first control signal and in accordance with at least a second control signal, and wherein the modulator controller is further operative to successively derive the first and second control signals from the RZ modulated optical signal in successive intervals.

59. An optical modulator according to claim 51, wherein the modulator controller is operative to bias the second optical modulator at a bias point other than a quadrature point of the second optical modulator.

60. A method according to claim 51, wherein the modulator controller is operative to drive the second optical modulator with an asymmetric version of the data signal.

61. An optical transmitter, comprising:
  modulation circuitry operative to generate a modulated optical signal in accordance with a plurality of control signals, each control signal being selectively generated exclusively in different successive non-overlapping control intervals, each control signal being associated with a corresponding one of a plurality of modulation characteristics; and
  a modulator controller operative:
  (i) to generate a detector output signal from the modulated optical signal; and
  (ii) to successively derive each of the respective control signals for the respective modulation characteristics from the detector output signal;
  wherein the modulator controller further comprises:
  a plurality of integrators, each integrator being operative in a corresponding control interval to integrate the detector output signal to generate a correction signal for the modulation characteristic associated with the control interval; and
  a plurality of adders, each adder being operative in a corresponding interval to sum the correction signal with a corresponding one of dither signals to generate the control signal for the modulation characteristic associated with the control interval.

62. An optical transmitter according to claim 61, wherein the modulation characteristics include (i) the extinction ratio of the modulated optical signal, and (ii) the phase alignment between a return to zero pulse component and a non return to zero data component of the modulated optical signal.

63. An optical transmitter, comprising:
  first and second cascaded optical modulators operative to generate a modulated optical signal in accordance with respective modulation and bias input signals;
  a coupler operative to generate an optical feedback signal from the modulated optical signal;
  phase shifting circuitry operative to generate a phase shifted pulse signal from a clock signal in accordance with a phase control signal supplied thereto;
  a first amplifier operative to generate an amplitude modulated pulse signal from the phase shifted pulse signal in accordance with a first AM control signal;
  a second amplifier operative to generate the modulation input for the second modulator from a data signal in accordance with a second AM control signal; and
  a modulator controller operative:
  (i) to generate a detector output signal by coherently detecting the presence of a first dither signal in the optical feedback signal;
  (ii) in a first interval, to (a) generate the second AM control signal from the first dither signal, and (b) to integrate the detector output to generate a first correction signal, the first correction signal being summed with a second dither signal to generate the bias input signal for the second modulator, the second dither signal being equal to a first predetermined gain factor times the first dither signal;
  (iii) in a second interval, to (a) generate the first AM control signal from the first dither signal, and (b) to integrate the detector output to generate a second correction signal, the second correction signal being summed with a third dither signal to generate the bias input signal for the first modulator, the third dither signal being equal to a second predetermined gain factor times the first dither signal; and
  (iv) in a third interval, to integrate the detector output to generate a third correction signal, the third correction signal being summed with the first dither signal to generate the phase control signal.

* * * * *

UNITED STATES PATENT AND TRADEMARK OFFICE
CERTIFICATE OF CORRECTION

| | |
|---|---|
| PATENT NO. | : 7,394,992 B2 |
| APPLICATION NO. | : 10/386358 |
| DATED | : July 1, 2008 |
| INVENTOR(S) | : Myles Kimmitt et al. |

Page 1 of 1

It is certified that error appears in the above-identified patent and that said Letters Patent is hereby corrected as shown below:

Column 16, claim 50, line 30, "the," should read --the--;

Column 16, claim 51, line 35, "phase" should start a new paragraph; and

Column 16, claim 51, line 38, "further to" should read --further operative to--.

Signed and Sealed this

Twenty-sixth Day of May, 2009

JOHN DOLL
*Acting Director of the United States Patent and Trademark Office*